United States Patent [19]

Semple et al.

[11] Patent Number: 4,986,473

[45] Date of Patent: Jan. 22, 1991

[54] CROP SPRAYER SHIELD

[76] Inventors: D. Gavin Semple, R.R. 2, Craven, Saskatchewan, Canada, S0G 0W0; Donald J. Vass, 3322 Fourth Ave., N. Regina, Saskatchewan, Canada, S4R 0V6

[21] Appl. No.: 238,129

[22] Filed: Aug. 30, 1988

[30] Foreign Application Priority Data

May 14, 1987 [CA] Canada .................................. 537182

[51] Int. Cl.[5] .................................................. B05B 1/28
[52] U.S. Cl. .................................. 239/104; 239/288.5
[58] Field of Search ............ 239/103, 104, 150, 288.3, 239/288, 288.5, 159, 499, 504, 518

[56] References Cited

U.S. PATENT DOCUMENTS 1,462,861 7/1923 Jordan .................................. 239/104
2,589,020 3/1952 North, Jr. ........................... 239/104
2,647,793 8/1953 Mosher ............................... 239/150
2,717,177 9/1955 Goda, Sr. ............................ 239/150
3,952,955 4/1976 Clements .......................... 239/288.5
3,963,180 6/1976 Wagner ............................ 239/288.5
4,679,735 7/1987 Pay .................................. 239/288.5

FOREIGN PATENT DOCUMENTS 97333 1/1961 Norway ............................. 239/104

*Primary Examiner*—Andres Kashnikow
*Assistant Examiner*—Michael J. Forman
*Attorney, Agent, or Firm*—George A. Seaby

[57] ABSTRACT

The conventional spray shield for use on crop sprayers includes a large cover for the entire spray boom. The cover extends downwardly to the top of the crop being sprayed, and consequently impedes access to the spray nozzles and hides the spray pattern. Thus, the operator of the sprayer is not aware of blocked nozzles. A solution to the problem is to provide individual spray hoods over each nozzle, the hoods having essentially the same shape as the spray produced by the nozzle, i.e., conical with an elliptical horizontal cross section at the discharge end. The hoods are sufficiently short that they terminate above a crop in the use position, so that the sprays are visible and the nozzles are readily accessible.

3 Claims, 2 Drawing Sheets

CROP SPRAYER SHIELD

BACKGROUND OF THE INVENTION

1. Field of the Invention

This invention relates to a spray shield for use on crop spraying equipment.

The conventional crop or field sprayer includes a boom assembly attached to a trailer and extending outwardly from both sides thereof in the spraying position. The boom assembly includes an elongated pipe or boom carrying a plurality of spaced apart nozzles, each having a spray tip for dispensing liquid. The currently preferred flat fan spray tip distributes the liquid in an elliptical pattern, the major axis of which is inclined with respect to the axis of the boom. When a plurality of such tips are spaced equidistant apart along the length of the boom, the spray patterns formed by the tips overlap but do not interfere with each other. Because the patterns flare or fan out, overlap without interfering with each other and are spaced equidistant apart, the spray can be distributed along the length of the boom with a plus or minus 5% variation in spray tip output.

On the other hand, because the droplets are so small, they can readily be deflected from their normal pattern by a wind of 10 km/hr or greater. Spray distribution can easily be disrupted to reach unacceptable levels, i.e. an unacceptably large crop area is missed by the spray. Because of the relatively short spraying season, it is almost inevitable that spraying must sometimes be done during unfavorable windy conditions.

2. Discussion of the Prior Art

One solution to the above mentioned problem is to provide a spray cover or hood over all or most of the boom structure. Such solution is proposed, for example by U.S. Pat. No. 3,512,714, which issued to M. E. Phelps et al on May 29, 1970. The Phelps et al and other commercially available spray hoods either contact or come close to the top of the crop being sprayed to ensure minimal wind interference with the minute droplets. Thus, such devices possess the disadvantages that they are large, cumbersome and expensive to produce. Moreover, the hoods extend so far from the boom that the spray nozzles and tips are not readily accessible, and there is no way of knowing when a nozzle or tip becomes plugged because the spray patterns are not visible.

The object of the present invention is to solve the above-mentioned problems by providing a relatively simple, economical spray shield, which substantially reduces wind interference with a spray pattern while still permitting access to the spray nozzle or tip.

GENERAL DESCRIPTION OF THE INVENTION

Accordingly, the present invention relates to a spray shield for use on crop spraying equipment of the type including a spray boom for carrying liquid to be sprayed and a plurality of spaced apart nozzles for discharging liquid from the boom, the shield comprising substantially conical hood means of essentially the same shape as the spray pattern produced by a nozzle for mounting on the boom and for extending downwardly therefrom into surrounding relationship to the nozzle.

BRIEF DESCRIPTION OF THE DRAWINGS

The invention will be described in greater detail with reference to the accompanying drawings, which illustrate a preferred embodiment of the invention, and wherein.

DESCRIPTION OF PREFERRED EMBODIMENT

Figure 1:
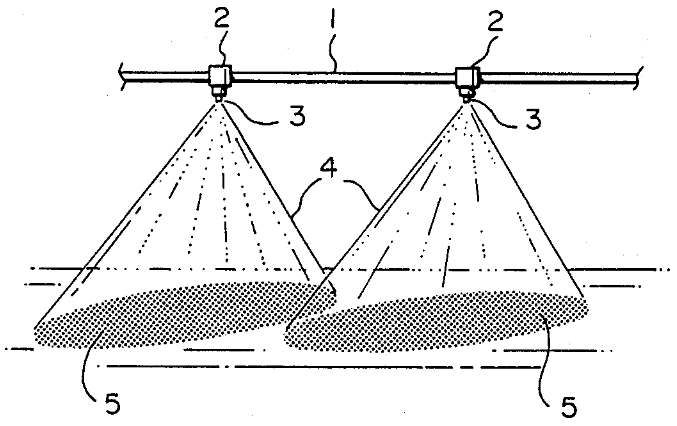
FIG. 1 is a schematic perspective view of a section of a spray boom without spray shields.

With reference to FIG. 1 the conventional crop spraying equipment includes an elongated pipe or boom 1, which is pivotally connected to a trailer (not shown) for extension outwardly therefrom to the spraying position shown in FIG. 1. A plurality of nozzles 2 are provided on the boom 1. The nozzles 2 are spaced equidistant apart, and include spray tips 3 for producing an elliptical cone 4 of liquid, i.e. a generally conical liquid spray, a horizontal section or plane of which is elliptical. The cones 4 produce elliptical patterns 5 of the fine droplets of liquid on a crop. The major axes of the patterns 5 are inclined with respect to the longitudinal axis of the boom 1, and the patterns 5 overlap without interfering with each other so that the crop is covered uniformly and more or less completely during passage of the spray device thereover.

In the absence of any spray shield or cover, the cones 4 and small liquid droplets would be affected by the wind, which adversely affects the spray pattern. In order to reduce or negate the effect of the wind, an individual shield generally indicated at 6 is provided on each nozzle 2. The shield 6 extends downwardly from the boom 1, but stops above the top surface of the crop, so that the spray cone 4 can be seen by the operator of the sprayer.

Figure 5:
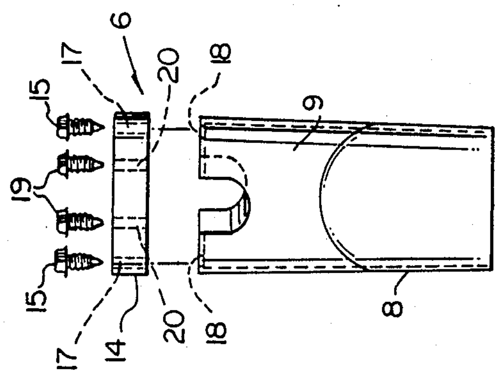
FIG. 5 is an exploded end view of the spray shield of FIGS. 3 and 4.
Figure 3:
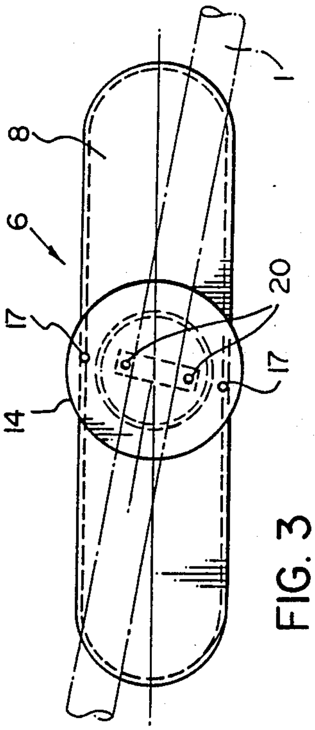
FIG. 3 is a plan view of a spray shield in accordance with the present invention.
Figure 4:
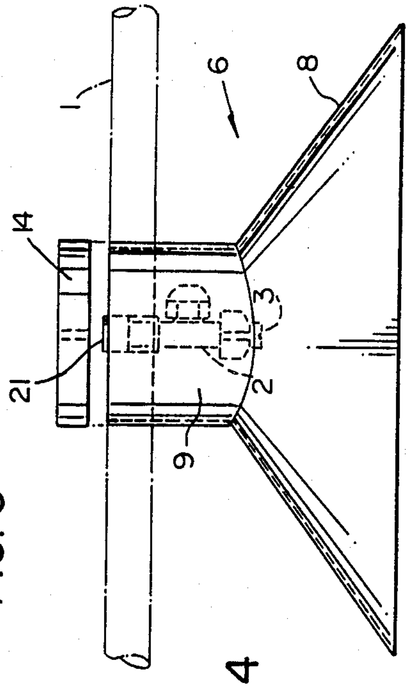
FIG. 4 is an exploded, side elevation view of the spray shield of FIG. 3.

Referring to FIGS. 3 to 5, each spray shield 6 includes a generally conical hood 8 of more or less elliptical cross section throughout its height. The hood 8 tapers upwardly to a cylindrical neck 9, which surrounds a nozzle 2 (FIG. 4) when the shield is mounted on the boom 1.

The neck 9 extends upwardly to the top of the boom 1. A concave groove 11 is provided in the top end of the neck 9 for receiving the boom 1, so that the boom 1 can be sandwiched between the top of the neck and a disc 14. The disc 14 is attached to the top end of the neck 9 by screws 15 extending into aligned threaded holes 17 and 18 in the disc 14 and the neck 9, respectively. The disc 14 is attached to the nozzle body 2 using nozzle body screws 19, which extend through aligning holes 20 (FIGS. 3 and 5) in the disc 14 to ensure proper alignment of the hood 8 with respect to the boom 1.

Figure 2:
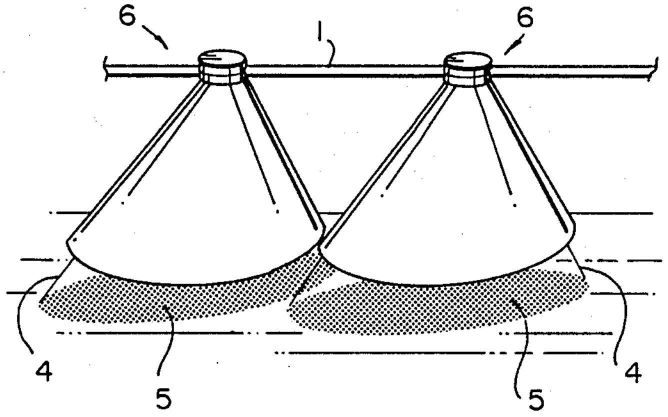
FIG. 2 is a schematic perspective view of the section of spray boom of FIG. 1 with spray shields in accordance with the present invention mounted thereon.

During normal operation, the shield restricts the spray cone 4 (FIG. 2) to the desired generally conical shape. Because the distance between the bottom of the hood 8 and the crop is small, the spray droplets forming the cone 4 are, at worst, only slightly affected by wind conditions. While the dimensions are not critical, typically, the total height of the shield is approximately 8¾ inches, the width of the hood 8 as viewed from the end (FIG. 5) is approximately 4¼ inches, and the length of the hood, i.e. the length of the major axis of the bottom of the hood is approximately 18 inches. The most widely used fan tips 3 have an 80° to 110° spray angle. The recommended distance from the tip to the top of the crop or the target is 10 to 19 inches. The distance from the tip 3 to the bottom edge of the hood 8 is 5 to 6 inches. Consequently, the spray is visible to the sprayer operator for from 5 to 14 inches. If a tip 3 becomes plugged, the tip is readily accessible for cleaning by reaching into the hood 8. The hood is typically offset, i.e. inclined with respect to the boom 1 by 10° for alignment with the spray cone.

It will be appreciated that the shield structure described hereinbefore can be installed on existing crop spraying equipment, without alterations to such equipment. The spray shield is produced using a light polyethylene plastic which is rotationally molded, but other materials can be used.

We claim:

1. A spray shield for agricultural crop spraying equipment of the type including a spray boom for carrying liquid to be sprayed and a plurality of spaced apart nozzles for discharging liquid from the boom, the shield comprising hood means including a cylindrical neck for mounting on the boom in surrounding relationship to a nozzle, and a substantially elliptical body flaring downwardly and outwardly from said neck, said elliptical body having essentially the same shape as the spray pattern produced by the nozzle so as to maintain the integrity of the spray pattern from the nozzle and through the elliptical body, the height of the shield being such that the bottom end thereof is above the crop being sprayed during use of the shield, whereby the spray from the nozzle is protected from the wind while being at least partly visible to the spraying equipment operator.

2. A spray shield according to claim 1, including alignment means for ensuring that said hood means is properly aligned with said nozzle and that all said hood means are aligned with each other on the spray boom.

3. A spray shield according to claim 2, including disc means for mounting said hood means on the boom, and nozzle locating means in said disc means defining said alignment means.

* * * * *